United States Patent [19]

Molter et al.

[11] Patent Number: 5,320,718
[45] Date of Patent: Jun. 14, 1994

[54] METHOD FOR REMOVING OXIDIZABLE ORGANIC COMPOUNDS FROM AN AQUEOUS SOLUTION

[75] Inventors: Trent M. Molter, Enfield; Philip J. Birbara, Windsor Locks; William J. Parente, Burlington, all of Conn.

[73] Assignee: United Technologies Corporation, Windsor Locks, Conn.

[21] Appl. No.: 564,269

[22] Filed: Aug. 7, 1990

[51] Int. Cl.$^5$ .......................... C25B 1/02; C25F 5/00; C02F 1/46
[52] U.S. Cl. ................................ 204/101; 204/129; 204/141.5; 204/130; 204/149; 204/151; 210/7 R
[58] Field of Search ............... 204/101, 129, 131, 149, 204/141.5, 151, 130; 210/748

[56] References Cited

U.S. PATENT DOCUMENTS 3,725,226  4/1973  Stoner ..................... 204/149
4,639,298  1/1987  Kreh et al. ................ 204/59 R

OTHER PUBLICATIONS

Grant et al., *Chemical Dictionary*, "Organic", Fifth Edition, p. 412.

Primary Examiner—Kathryn Gorgos
Attorney, Agent, or Firm—Alan C. Cohen

[57] ABSTRACT

A method for removing oxidizable organic compounds from an aqueous solution is disclosed which utilizes an electrolysis cell having a solid polymer electrolyte. The organic compounds are introduced into the anode chamber and a series of potentials are applied to the anode which potentials cause the organic compounds to absorb onto the cathode catalyst, oxidize the organic compounds and then regenerate or de-foul the catalyst.

14 Claims, 1 Drawing Sheet

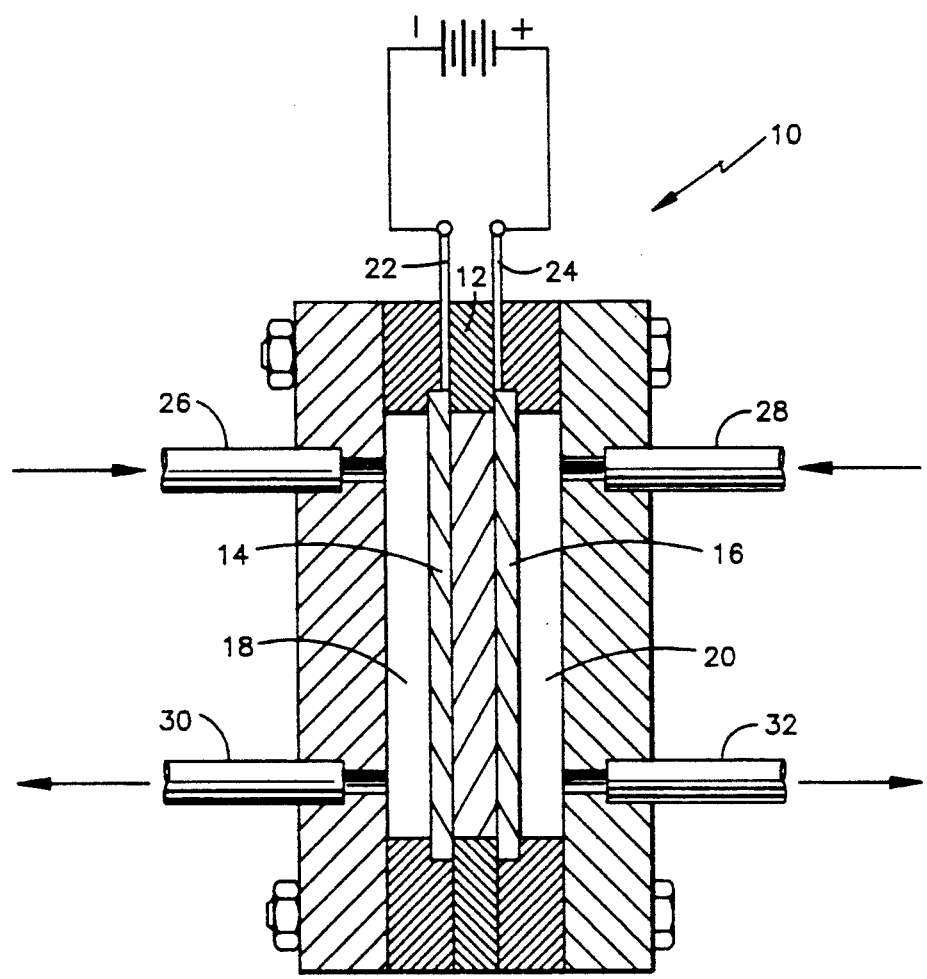

METHOD FOR REMOVING OXIDIZABLE ORGANIC COMPOUNDS FROM AN AQUEOUS SOLUTION

TECHNICAL FIELD

This invention generally relates to the cleansing of an aqueous solution of organic compounds. More particularly to the removal of oxidizable organic compounds from an aqueous solution.

BACKGROUND OF THE INVENTION

In view of current environmental pollution problems, particularly in the area of water quality, it is becoming increasingly important to establish techniques for cleansing contaminated water of undesirable contaminants. Contamination of water with oxidizable organic compounds is of particular importance. Some particularly important organic contaminants are alcohols or organic acids. Many of these contaminants have proven difficult to remove, particularly low molecular weight organics at very low concentrations.

This problem exists both in large urban water supplies and in other smaller water supplies such as those found in space vehicles and submarines. These smaller water supplies offer an additional challenge to any purification device in that the size and efficiency of the purification device must be small enough and energy efficient enough so that it is compatible with the limited space and energy resources associated with these environments.

Therefore, what is needed in this art is a method of removing organic compounds from aqueous solutions which minimizes weight, volume and power requirements using an efficient and compact process.

DISCLOSURE OF THE INVENTION

The present invention discloses a method for removing oxidizable organic compounds from an aqueous solution by introducing the aqueous solution into the anode side of an electrolysis cell having a solid polymer electrolyte. This is achieved by applying a sufficient potential to the anode to absorb the organic compounds onto the surface of the anode. A second potential is then applied to the anode sufficient to oxidize the absorbed organic compounds. A third potential to the anode sufficient to de-foul or electrochemically clean the anode.

The object of this invention is to provide an efficient method for the removal of oxidizable organic contaminants from an aqueous solution.

A further object of this invention is the application of a solid polymer electrolysis cell for use in a water purification process to remove oxidizable organic contaminants.

BRIEF DESCRIPTION OF DRAWINGS

The drawing depicts a typical electrolysis cell useful in the invention.

BEST MODE FOR CARRYING OUT THE INVENTION

The present method utilizes one or more conventional solid polymer electrolysis cells. The sole Figure depicts a schematic of a typical electrolysis cell. The cell 10 having a solid polymer electrolysis membrane 12 between and in contact with a catalytic anode 14 and a catalytic cathode 16. There is an anode chamber 18 and a cathode chamber 20. Also depicted are electrical connectors 22, 24 which permit the application of a potential between the anode and the cathode as well as inlet ports 26, 28 and outlet ports 30, 32 for the cathode and anode chambers. All of these components are well documented in the literature and are conventional and well known to those skilled in the art. Naturally, a plurality of these cells may be configured in any number of ways to produce a device useful in the practice of the present method. The number of cells and their configuration will be dictated by the amount of solution to be cleansed, the quantity of organic contaminants and the efficiency of each cell.

The method comprises introducing the contaminated aqueous solution into the electrolysis cell in sufficient proximity to the anode electrode so that when the absorption potential is applied to the anode, the organic compounds will be drawn to the catalytic surface and absorbed onto it. Ideally, the organic compounds would be brought into physical contact with the catalytic surface; however, this is not necessary to effect absorption. Other factors affecting absorption are the flow rate or residence time the solution is in proximity to the anode and will vary depending on the efficiency of the cell in its ability to absorb the organic compounds, the amount of contaminant in the solution, the temperature of the solution, the actual potential applied, and other factors specific to the particular cell configuration and operating parameters. However, these parameters are easily determined by simple experimentation through operation of the cell and analytical determination of the amount of organics removed within a particular operating regime.

The catalyst positioned on the anode of the cell may be any metallic catalyst which will cause the organic compound to be absorbed onto the surface and cause oxidation of the organic compounds at the desired oxidation potential. Although base metals or alloys of base metals may be useful in the practice of this invention, the preferred materials are catalysts formed of precious metals or alloys of one or more precious metals or of one or more precious metals and other non-precious metals. The precious metals being platinum, ruthenium, iridium, gold, rhodium, palladium and silver. It is preferred that such catalysts are of very high surface areas and are deposited directly onto the surface of the membrane. Such catalysts and membranes are the same as those used in conventional solid polymer electrolyte fuel cells and electrolysis cells and again are known to those skilled in the art.

The cathode electrode should be of similar construction having a similar catalytic layer positioned on its surface. The catalyst may be made of the same material and preferably has a very high surface area similar to that of the anode. Again, as is the case with the anode, such cathode electrodes may be the same as those generally used in solid polymer electrolyte fuel cells and electrolysis cells.

The energy source used to supply direct current to create the necessary potentials at the anode may be supplied by any traditional power source including but not limited to batteries, generator etc. An alternating current supply may be used; however, conventional power regulatory equipment would be necessary to convert the alternating current to direct current. The only limitation is that the current supply must be capable of supplying the requisite operating potentials to the cell.

Any organic compound which is subject to oxidation may be oxidized using the present method. Typically, these compounds will be in the form of very low molecular weight organic compounds such as low molecular weight alcohols (methanol, ethanol, propanol, etc.) as well as aldehydes (formaldehyde, acetaldehyde, propionaldehyde, heptaldehyde) and organic acids (formic acid, acetic acid, carboxylic acid). The concentrations of such materials in the solution can range from very high (about 50 vol percent) to very low concentrations in the parts per million range. However, the organic compounds may be of higher molecular weight and require multiple oxidation steps to break them down to sufficiently low molecular weights to be totally oxidized on a single cycle.

The method comprises introducing the organic compound aqueous solution into the anode side of the electrolysis cell and applying a potential to the anode. This potential should be sufficient to cause the organic compounds to be absorbed onto the surface of the catalytic layer of the anode. These potentials may be from about 0.0 volts to about 1.0 volt with a preferred potential of about 0.1 volts to about 0.4 volts. As was stated above, ideally, it would be best for the organic material to be in contact with the catalytic layer; however, this is not mandatory. It is merely necessary to have the organic compounds sufficiently close to the catalyst to be drawn to the catalyst by the potential. The duration of the charge will depend on a number of factors including, residence time, species type of organic, temperature. However, a typical time span for this charge will be about 10 to about 1000 milliseconds with a preferred time of from about 30 to about 100 milliseconds.

Subsequent to the absorption of the organic compounds onto the catalytic surface, the anode potential is increased to a sufficient potential to oxidize the absorbed organics ultimately producing carbon dioxide. Such a potential would range from about 0.5 volts to about 10.0 volts with a preferred potential being 1.0 volt to about 4.0 volts. In the instance where the organic compounds are low molecular weight materials such as C1-C5 alcohols, the oxidation to carbon dioxide will be almost immediate. However, in the event of larger molecular weight materials i.e., $C_5$-$C_{10}$ or greater the compounds may have to undergo a series of oxidations until the compound is broken into sufficiently small compounds so that a single oxidation step will produce carbon dioxide. This may result in the compound undergoing a plurality of adsorption/oxidation cycles until it is totally oxidized. A typical chemical reaction for the described oxidation process is shown in equation (1) below:

$$CH_3OH + H_2O \rightarrow CO_2 + 3H_2 \qquad (1)$$

After the oxidation step has taken place, the potential of the anode is reversed from positive to negative to de-foul or regenerate the catalytic layer. During the oxidation phase, an oxide layer may be formed on the catalytic surface, (i.e., the platinum is converted to platinum oxide). Additionally, other contaminants may also remain on the catalytic surface either as a result of the oxidation reaction itself or other contaminants drawn to the catalytic surface during the application of the adsorption potential. The oxide layer and other contaminants can reduce the activity of the catalyst and thereby reduce the efficiency of the electrolysis cell.

The potential applied to the anode to effect the de-fouling or regenerating of the anode catalytic layer will vary depending on the physical composition of the catalyst; however, negative potentials ranging from about 0 volts to about −1.0 volts with a preferred range of about −0.15 volts to about −0.35 volts are recommended (reverse potential). Again, as is the case with the application of the previous potentials, this potential is also applied for a short duration of about 5 milliseconds to about 1000 milliseconds with a preferred duration of about 60 milliseconds to about 200 milliseconds.

After the negative potential has been applied to the anode for the require time, the polarity is again reversed and the cycle is repeated. It is the rapid cycling of potentials or pulsing which permits the efficient and continuous oxidation of the organic contaminants.

The pulse potentials applied between the cathode and anode may take the form of any number of electrical charges, they may be saw tooth, sinusoidal, etc. As the charges are of such short duration the preferred profile will be dependent upon the nature of the contaminant to be oxidized.

The aqueous solution which is introduced to the anode side of the electrolysis cell may be pulsed across the surface of the anode in a series pressurization steps or preferably may be permitted to flow at a given rate past the anode and out the electrolysis cell. The flow rate is not critical nor is the residence time for the solution; however, the longer the residence time, the more cycles a particular portion of the solution would undergo, and therefore, the more complete the oxidation would be for that cycle. One approach may be to continually recycle the solution through the cell until the purity level of the solution is achieved. Naturally, this approach would be more useful where the solution represents a finite supply of liquid and may be constantly cycled through a holding tank of some sort. Applications of this technique may be useful on space ships or submarines as opposed to large industrial or terrestrial water supplies. In the latter situations where great quantities of water are to be treated and where the solution is constantly flowing, it may be more practical to pass the solution through a plurality of electrolysis cells in series to reduce the level of contaminants.

Although it is not necessary, under certain circumstances, it may be desirable to introduce hydrogen gas or some other protic material such as water which would provide a continuous supply of protons to the cell reaction into the anode side of the electrolysis cell. During the oxidation phase of the process, hydrogen is generated as the $H_2O$ produced by the decomposition of the organic compound is further electrolyzed to produce $2H^+ + \frac{1}{2}O_2 + 2e^-$. The resulting oxygen may contaminate the catalytic layer of the anode by converting metal catalyst to the oxide form. In addition, the hydrogen ions migrate through the electrolyte toward the cathode electrode.

When the cell is switched to the de-fouling or regenerating mode, the $H^+$ ions are needed to reduce the metal oxide to pure metal again. These hydrogen ions react with the oxygen on the catalyst to form water. Typically, there is no need for excess hydrogen to be added to the cell during normal operation as sufficient hydrogen is generated, during the oxidation of the compound, to de-foul or regenerate the catalytic layer. However, during start-up of the cell, it may be necessary to introduce hydrogen into the anode area to supply an initial amount of hydrogen to start the de-fouling or regenerating process. These proton donating materials may be the same as those used in the water electrolysis processes utilizing solid polymer electrolyte cells known to those skilled in the art.

EXAMPLE I

An electrolysis cell having a 0.05 square foot of active area was used. The cell utilized a Nafion ™ 120 membrane as the solid polymer electrolyte and platinum catalysts on both the anode and the cathode. The system was operated in the batch mode. In this mode, one liter of water containing 327 parts per million of formic acid was prepared. The water was then placed in a holding tank. The solution was then pumped from the holding tank into the anode of the electrolysis cell, across the face of the catalyst electrode. The water would then exit the cell and return to the holding tank. The water was continuously cycled through the electrolysis cell for 150 minutes. The temperature of the water was maintained at 75° F. In addition, during this test, a constant flow of hydrogen (or water) was supplied to the cathode side of the cell to act as a proton source. The flow rate of the water through the cell was 150 cc per minute.

As the water was flowing through the cell, a series of potentials were applied to the cell for a duration of 150 milliseconds each (see FIG. 1). The first potential of +0.2 volts was applied to the anode to absorb the formic acid onto the surface of the catalyst. After 150 milliseconds, a step change in voltage was applied to +2.0 volts to the anode. At this potential, the absorbed formic acid was oxidized to form carbon dioxide and dissolved oxygen. After 150 milliseconds, the voltage was step dropped to −0.20 volts on the anode. At this potential, the platinum oxide formed during the previous oxidation step was reduced to platinum metal and gaseous by products of the oxidation step were desorbed from the anode catalyst.

Analysis of the water after test showed that the solution contained 176 parts per million formic acid down from the 327 parts per million of formic acid initially. This was a reduction of 50% in the quantity of formic acid.

EXAMPLE II

A second test was performed using the same cell as in Example I, the same operating parameters. This time, a one liter water solution was made up having 100 ppm of methanol, 100 ppm ethanol and 100 ppm propanol. The electrolysis cell was operated for one hour after which the water was analyzed. The results showed that the concentration of methanol was 50 ppm, ethanol was 60 ppm and propanol was 75 ppm.

We claim:

1. A method for removing oxidizable organic compounds from an aqueous solution comprising:
   a) introducing an aqueous solution containing oxidizable organic compounds into an anodic chamber of a solid polymer electrolyte electrolysis cell said cell having an anode, a cathode, and a cathode chamber wherein a metal catalyst is positioned on the surface of the anode;
   b) applying an absorption potential to the anode of the electrolysis cell sufficient to cause the oxidizable organic compounds to absorb onto the surface of the anode;
   c) applying an oxidation potential to the anode sufficient to oxidize said absorbed oxidizable organic compounds and thereby produce carbon dioxide and hydrogen gas and forming a metal oxide layer on the anode catalyst;
   d) applying a regenerating potential to the anode sufficient to reduce the metal oxide layer formed on the anode catalyst to the non-oxidized metal catalyst state.

2. The method of claim 1 wherein a hydrogen containing fluid is introduced into the cathode chamber.

3. The method of claim 1 wherein the anode electrode catalyst comprises one or more noble metals.

4. The method of claim 1 wherein the anode electrode catalyst comprises an alloy of one or more metals at least one of which is a noble metal.

5. The method of claim 4 wherein the oxidizable organic compounds contain oxygen.

6. The method of claim 1 wherein the oxidizable organic compounds comprise those containing C1-10.

7. The method of claim 1 wherein the absorption potential is about 0.1 volts to about 0.4 volts.

8. The method of claim 1 wherein the oxidation potential is about 1.0 volts to about 4.0 volts.

9. The method of claim 1 wherein the regenerating potential is about −0.1 volts to about −0.4 volts.

10. The method of claim 1 wherein the absorption potential is about 0.15 volts to about 0.25 volts.

11. The method of claim 1 wherein the oxidation potential is about 1.5 volts to about 2.5 volts.

12. The method of claim 1 wherein the regenerating potential is about −0.15 volts to about −0.35 volts.

13. The method of claim 1 wherein the absorption potential is maintained for about 30 milliseconds to about 100 milliseconds; the oxidation potential is maintained for about 30 milliseconds to about 100 milliseconds and the regenerating potential is maintained for about 60 milliseconds to about 200 milliseconds.

14. The method of claim 1 wherein the metal anode catalyst is platinum.

* * * * *